(12) United States Patent
Bader et al.

(10) Patent No.: US 7,643,946 B2
(45) Date of Patent: *Jan. 5, 2010

(54) METHOD AND SYSTEM FOR APPRAISING THE WEAR OF AXLES OF A ROBOT ARM

(75) Inventors: Axel Bader, Friedberg (DE); Sven Hansen, Berstadt (DE); Steffen Schmidt, Aalen (DE); Kim Henrich, Gelnhaar (DE)

(73) Assignee: ABB Patent GmbH, Ladenburg (DE)

( * ) Notice: Subject to any disclaimer, the term of this patent is extended or adjusted under 35 U.S.C. 154(b) by 402 days.

This patent is subject to a terminal disclaimer.

(21) Appl. No.: 11/153,069

(22) Filed: Jun. 15, 2005

(65) Prior Publication Data

US 2005/0278148 A1  Dec. 15, 2005

(30) Foreign Application Priority Data

Jun. 15, 2004 (GB) ........................ 10 2004 028 559

(51) Int. Cl.
- *G01B 3/44* (2006.01)
- *G01B 3/52* (2006.01)
- *G01L 3/00* (2006.01)
- *G06F 11/30* (2006.01)
- *G21C 17/00* (2006.01)

(52) U.S. Cl. ............................ 702/41; 702/34; 702/184
(58) Field of Classification Search ............. 702/34, 702/35, 41, 36, 43, 183–185; 700/174, 175; 73/865.9

See application file for complete search history.

(56) References Cited

U.S. PATENT DOCUMENTS

| | | | |
|---|---|---|---|
| 3,882,305 A | 5/1975 | Johnstone | .................. 702/183 |
| 5,083,070 A * | 1/1992 | Poupard et al. | .......... 318/568.1 |
| 5,566,092 A | 10/1996 | Wang et al. | .................. 702/185 |
| 5,568,028 A * | 10/1996 | Uchiyama et al. | ........... 318/566 |
| 6,615,103 B2 | 9/2003 | Fujishima et al. | ........... 700/175 |
| 6,732,056 B2 * | 5/2004 | Kluft et al. | ..................... 702/39 |
| 7,089,085 B2 * | 8/2006 | Kim | .......................... 700/254 |
| 7,316,170 B2 * | 1/2008 | Bader et al. | ................. 73/865.9 |
| 2003/0061872 A1 | 4/2003 | Giessler | ....................... 73/121 |
| 2004/0039478 A1 | 2/2004 | Kiesel et al. | ................ 700/174 |

(Continued)

FOREIGN PATENT DOCUMENTS

DE  25 00 086 B2  7/1975

(Continued)

OTHER PUBLICATIONS

English Abstract of EP 791872, Aug. 27, 1997.*

*Primary Examiner*—Michael P Nghiem
(74) *Attorney, Agent, or Firm*—Laurence A. Greenberg; Werner H. Stemer; Ralph E. Locher

(57) ABSTRACT

A method determines the wear of axles of a robot arm of an industrial robot. A torque profile of at least one axle taken during at least one working cycle of the industrial robot is used as a basis for an analysis. The torque profile is analyzed for portions of the torque profile that exceed a previously fixed torque band, and current axial wear is determined by assessing the frequency and/or the curve profile of the portions of the torque profile. A system is provided for determining the wear.

15 Claims, 3 Drawing Sheets

U.S. PATENT DOCUMENTS

| | | | |
|---|---|---|---|
| 2004/0210352 A1 | 10/2004 | Bayer et al. | 701/1 |
| 2005/0274208 A1* | 12/2005 | Bader et al. | 73/865.9 |
| 2005/0278067 A1* | 12/2005 | Bader et al. | 700/245 |
| 2006/0287768 A1* | 12/2006 | Bader et al. | 700/245 |

FOREIGN PATENT DOCUMENTS

| | | | |
|---|---|---|---|
| DE | 44 47 288 | A1 | 7/1995 |
| DE | 101 20 943 | A1 | 11/2002 |
| DE | 101 47 817 | A1 | 5/2003 |
| DE | 1 607 192 | * | 12/2005 |
| EP | 0 625 651 | B1 | 11/1994 |
| EP | 0 791 872 | A1 | 8/1997 |
| EP | 1 195 668 | B1 | 4/2002 |
| EP | 1 406 137 | A2 | 4/2004 |
| JP | 02262993 | A | 10/1990 |

\* cited by examiner

METHOD AND SYSTEM FOR APPRAISING THE WEAR OF AXLES OF A ROBOT ARM

BACKGROUND OF THE INVENTION

1. Field of the Invention

The invention relates to a method and a system for appraising the wear of axles of a robot arm of an industrial robot.

Methods for appraising the wear of axles on industrial robots that are based on the mechanical measurement of the axial backlash and appraise axial wear on the basis of the values measured are generally known. The appraisal is generally performed by the operating or service personnel, who can, on the basis of values obtained in their experience with handling the robots, interpret the measured values in such a way that on the one hand the state of wear is established, on the other hand a statement can be made as to whether and which measures have to be performed on the axles of the robot.

2. Summary of the Invention

It is accordingly an object of the invention to provide a method and a system for appraising the wear of axles of a robot arm which overcome the above-mentioned disadvantages of the prior art methods and devices of this general type, with which wear can be determined in the simplest possible way.

Accordingly, the method according to the invention for determining the wear of axles of a robot arm of an industrial robot has the following method steps. A torque profile of at least one axles during at least one working cycle of the industrial robot is taken as a basis for an analysis. The torque profile is analyzed for portions of the torque profile that leave a previously fixed torque band, and current axial wear is determined by assessing the frequency and/or the curve profile of the portions of the torque profile.

One advantage of the method according to the invention is that only a torque profile of the axle to be considered of the industrial robot is required in order to appraise axial wear. It is of secondary importance here whether the torque profile is measured at the time or is read out from an earlier measurement that has been stored in a data memory.

The proposed method considers in particular a working cycle or number of working cycles of the industrial robot. In principle, any time segment during the movement sequence of the industrial robot may be chosen as the working cycle. It is particularly meaningful, however, for a movement sequence of the industrial robot which the latter keeps repeating to be chosen as the working cycle, so that all the movements, all the tasks and all the loads that are performed during a repeat cycle, from the beginning of the performance of a task to the end of the performance of the task, are included. Such a working cycle therefore covers all the tasks and loads of the industrial robot. The wear appraisal for the axles concerned of a robot arm is accordingly accurate.

The analysis of the torque profile for portions of the torque profile that leave a previously fixed torque band and the assessment of the frequency and/or the curve profile of the portions of the torque profile take place according to the invention in an automated manner. This dispenses entirely with the previously necessary interpretation by operating or service employees specializing in this. In this way, the amount of data considered for the torque profile can be increased and the accuracy of the wear determination is enhanced. Altogether, the method according to the invention is consequently quicker and more accurate than those previously known.

An advantageous development of the method according to the invention is characterized in that the ratio of a maximum torque value to an averaged torque value in a previously defined time period within the working cycle considered is used for the assessment of the axial wear.

In the analysis of the torque profile, individual portions of the torque profile having a maximum torque are analyzed in particular, the rotational direction of the torque being immaterial. The portions of the torque profile are analyzed as to whether they have a maximum that goes beyond a previously set torque band, with the result that a torque loading exceeding the torque band has occurred. These maximum or extreme torque values are one of the factors responsible for increased wear of the axles and are accordingly taken into account in the assessment. The ratio mentioned at the beginning of maximum torque values to averaged values can be adapted more closely to a weighting factor, which is empirically determined.

A further form of the method according to the invention is characterized in that at least one curve profile, in particular the slope of the curve at a time directly before and possibly after an extreme, taken from the latter up to at least the next-following point of inflection of the torque curve, of a portion of the torque profile is used for the assessment of the axial wear.

For the assessment, therefore the steeply rising or steeply falling torque profiles in particular lead to a different basis for the assessment of the axial wear than for example shallow curve profiles. This has to be taken into account for example by different assessment factors, which are included in the assessment formula.

The set object is also achieved by a system for determining the wear of axles of a robot arm of an industrial robot, with a data module, which contains the data of a torque profile of at least one axle during at least one working cycle of the industrial robot, with an analysis module, with which portions of the torque profile that leave a previously fixed torque band can be selected, and with an assessment module, by which the frequency and/or the curve profile of the portions of the torque profile can be interpreted as axial wear, a data exchange between the data module, the analysis module and the assessment module being made possible.

The system for determining the wear of axles of a robot arm has three different functional modules. The functional module referred to as the data module contains the data of the torque profile to be considered or of the torque profiles to be considered in the event that a number of axles are being considered. In the analysis module, specific data provided by the data module can be selected in the way specified. In particular, those portions of the torque profile that leave a previously fixed torque band, that is to say have comparatively high torque values, are to be used for the instances of axial wear that are then to be appraised in the assessment module. In this case, the torque band is generally defined such that the limits of the band correspond to the permissible axial loading of the respective axle, for example coinciding with the limit-value loading specifications of a robot manufacturer or adopted with other empirically established limit values.

In an advantageous basic variant, the system according to the invention for determining wear requires no additional measured value pickups or other measuring devices that would not already be on the robot. Consequently, the construction is comparatively simple and the wear appraisal can be carried out particularly quickly and comparatively accurately on account of the automation of the system concerning the handling of the data, the analysis and the assessment of the data. In the basic variant as described above, the required data are taken from a robot control.

A development of the system according to the invention is characterized in that at least one of the modules is disposed in a robot control.

This additionally simplifies the equipment required. This is so because the robot control is a customary part of a robot system, so that the implementation of the module or modules in the robot control results in a particularly compact system.

However, it is also quite possible for individual modules or all the modules to be integrated in an evaluation device, in particular a measuring computer.

This achieves the advantage that the system according to the invention becomes mobile and is suitable for successive use on a number of industrial robots.

Furthermore, it is immaterial for the system according to the invention whether the torque profile can be read out from the robot control as direct or indirect values.

When indirect values of the torque profile are read out from the robot control, the torque values that are current at the time or else any stored torque values can be called up as the torque values. The system according to the invention can in this case detect a torque value or torque values without further data preparation. Indirect values refer to those values that are either available as an unscaled voltage value of the robot control or are made available as an analog voltage signal or other signal and first have to be interpreted or converted as a torque value. For this purpose, an analog-digital converter or some other transfer module may be disposed upstream of the system according to the invention.

In an advantageous form of the system according to the invention, the modules are in each case configured as computer program products.

Other features which are considered as characteristic for the invention are set forth in the appended claims.

Although the invention is illustrated and described herein as embodied in a method and a system for appraising the wear of axles of a robot arm, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
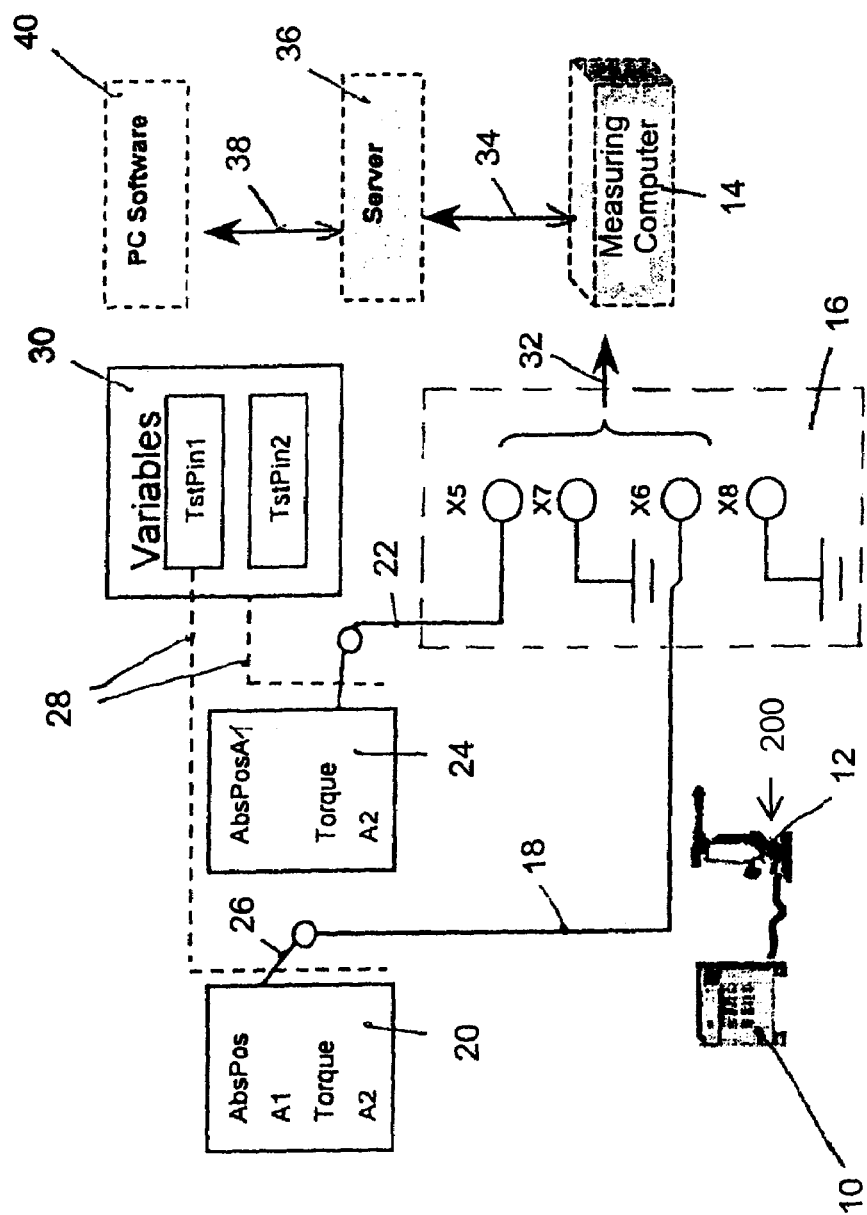
FIG. 1 is a block diagram showing an example of a possibility for connecting the system according to the invention to a robot controller.

Referring now to the figures of the drawing in detail and first, particularly, to FIG. 1 thereof, there is shown an example of a possibility for a connection between a robot controller 10, which controls a robot 12, and a system for wear appraisal 14. An interface 16 between the robot controller 10 and the system 14 is bordered by a frame of dashed lines and contains a number of interface points, which are denoted by X5, X6, X7 and X8. The interface 16 is in this case provided for tapping two signals of a robot axle, it being quite conceivable for a large number of signals of different axles to be sampled or removed via the interface 16. In the chosen example, the side of the interface 16 on which the robot 12 and its controller 10 are located is represented by the representation of the symbols for the robot 12 and its robot controller 10. On this side of the interface 16, a first data line 18 connects the connection point X6 to a first data selection switch 20 of the robot controller 10. In a comparable way, the connection point X5 is connected by a second data line 22 to a second data selection switch 24. Via a switching element 26, the first data line 18 can be switched either to a signal A1 of an absolute position of the robot axle or a torque signal A2 of the robot axle. In the chosen example, the switching element 26 connects the data line 18 to the signal A1 of the absolute position of the robot axle.

As a difference from this, the second data line 22 is connected to the torque signal A2 for the axle of the robot 12. The connection points X7 to X8, which are assigned to the signal point X5 and X6, respectively, are connected to ground.

The chosen example therefore shows the wiring of the interface 16 to data from the robot controller 10 merely concerning one axle. It is quite conceivable for the data of a number of axles or all the axles of the robot 12 to be connected to a corresponding interface, and that further signals can also be measured by the interface 16. The advantage of the wiring is that an absolute position of the axle can be assigned to each torque value, so that the absolute position of the axle can also be taken into account in an analysis of the torque values, for example for differentiating whether a high torque value has occurred as a result of a high load on the robot arm or as a result of an extreme position of the robot axle.

For test purposes, as to whether the signals made available can also be transmitted without any errors to the interface 16, a first data selection switch 20, 26 and a second data selection switch 24 are respectively connected to a testing device 30 by third data lines 28.

The interface 16 is also connected to the system for wear appraisal 14, here the measuring computer 14, which connection is indicated by a first arrow 32. Furthermore, the measuring computer 14 is connected by a fourth data line 34 to a server 36 and the latter is connected by a fifth data line 38 to a PC 40. In the example represented, the measuring computer 14 has the task of interpreting the voltage values of the robot axle made available at the interface 16 in analog form as values for a torque profile. The values correspondingly converted by the measuring computer 14 for the torque profile are transmitted to the data processing device 40 through the fifth data line 38, through the server 36 and through the fourth data line 34.

With the configuration represented in FIG. 1 the method according to the invention proceeds as follows.

Data signals A1 that are to be assessed as the absolute position of the axle are made available by the robot controller 10 at the connection point X6 via the first data line 18. In a comparable way, values A2 for the torque just applied at the axle of the robot 12 are transmitted by the robot controller 10 via the second data line 22. Both values A1, A2 are sensed together with a timing signal by the measuring computer 14 and initially stored. The signal value A1 for the absolute position of the first axle of the robot 12 is not absolutely necessary for the method according to the invention, but simplifies the interpretation of the measured values A2 for the torque for an expedient form of the method according to the invention.

It is just as unnecessary that the measuring computer 14 stores the data received. These data could also be further processed immediately, that is online, and transmitted to the PC 40 for the results to be displayed. However, here too it is expedient initially to store the measured values A1, A2 received for comparison purposes or for later comparative calculations, in order in this way also to have a copy of the original data available.

In this way, the entire torque profile of a complete working cycle of the robot 12 is transmitted to the PC 40. The latter also initially stores the received torque profile of the robot axle. In the chosen example, the working cycle of the robot 12 is to contain, in the first step, the action of moving to and gripping a work piece. The second working step is defined as the action of raising the work piece and subsequently bringing it to an end position for the work piece. Finally, the third working step for the robot 12 consists in that the work piece is released and the robot arm is moved back into its starting position, so that the then completed working cycle can be repeated.

The working cycle defined by the working steps is initially represented as a torque profile on the display device of the PC 40. Each portion of the torque profile that leaves a previously fixed torque band, that is to say permissible minimum and maximum values for the torque band of this axle, is defined as such and analyzed and subjected to an assessment in a subsequent method step.

In a simple assessment step, the frequency with which the torque band is left within a specific time, predetermined by the working cycle, is used as a measure for the assessment. Another possibility is that the curve profile in an analyzed portion of the torque profile is used for the assessment. Altogether, the frequency and/or the curve profile of the portions of the torque profile, possibly additionally provided with an empirically determined factor, is or are used to appraise the current axial wear caused by such a working cycle. The simplest axial wear that can be determined by the method according to the invention is therefore axial wear per working cycle. With the knowledge of the previously completed working cycles of the robot 12 from the historical operating data of the robot 12, the current state of wear of the robot 12, or of the axle or axles concerned, is then also determined according to the invention. On the basis of this appraisal, a statement relating to the time period for which this robot axle can continue to be operated with the present defined working cycle is then also made possible. In addition, recommendations as to how the loading of the robot axle in a working cycle can be reduced, and with it also the wear, can be calculated. The position signal 11 is also used for this purpose.

Figure 2:
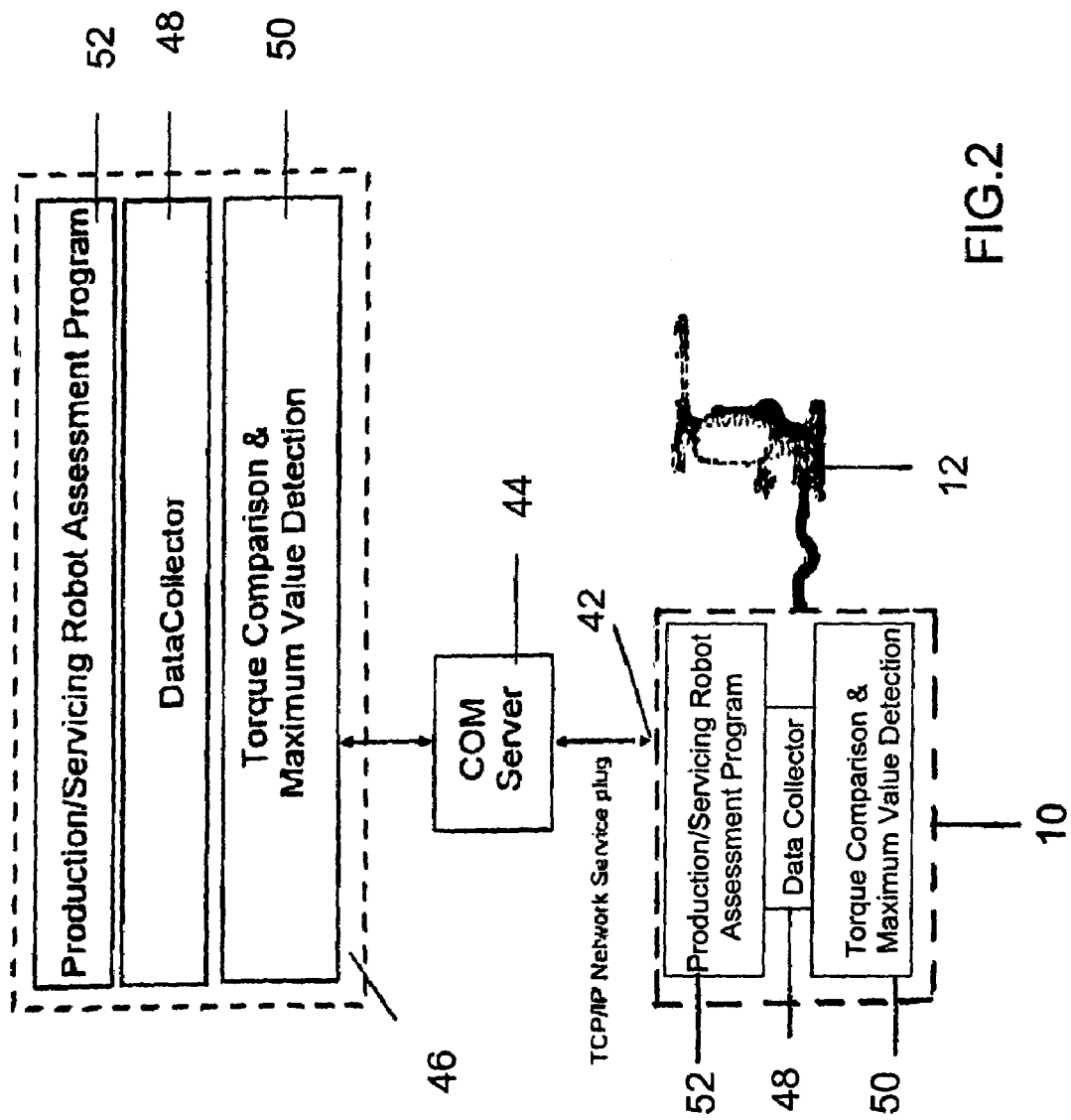
FIG. 2 is a block diagram of the system setup according to the invention.

FIG. 2 shows the example of a data flow from the robot controller 10 of the robot 12 via a TCP/IP interface 42, through which the data can be fed from the robot controller 10 to a TCP/IP server with a network 44. The TCP/IP network 44 therefore connects an evaluation device 46 to the robot controller 10. This example shows that the evaluation device 46 can be connected from the robot control 10 according to the invention by the network 44. In the chosen example, this is a standardized TCP/IP network. However, it is equally conceivable for the interface 42 to be integrated into an Internet interface, so that the network 44 is formed by the Internet, and the evaluation device 46 can consequently be disposed anywhere in the world without local restriction.

In the example, the system according to the invention for appraising the wear of axles of a robot arm of an industrial robot is realized with all its modules in the evaluation device 46. The torque profile is accordingly passed in the form of the data made available to the robot controller 10 from the interface 42 via the network 44 to the evaluation device 46. There, the data obtained are initially received by a data collector 48 and recorded and possibly stored as torque data or other data, in particular also in their time sequence. In this way, it is possible for a processing module 50 to interpret the data made available by the data collector 48 as torques for a torque comparison, for the maximum value detection and for the representation of the data as curves.

In a further module, an assessment module 52, the curve, the curve profile or specific aspects of the curve are assessed as wear, so that, at the end of the method according to the invention, a statement can be made concerning the extent to which a specific axle of the robot 12 is or has been exposed to particular, abnormal loads or loads exceeding specific permissible loads and of such a nature that a corresponding state of wear exists. These data with other data from production, servicing or the robot movement program, as indicated in FIG. 2 in the assessment module 52, altogether improve the quality of the statement concerning the wear appraisal or the state of the individual axles.

Alternatively, the evaluation device 46 in whole or one or more of the component parts such as the data collector 48, the processing module 50 or the assessment module 52 can be contained within the robot controller 10 itself which is optionally shown in FIG. 2.

Figure 3:
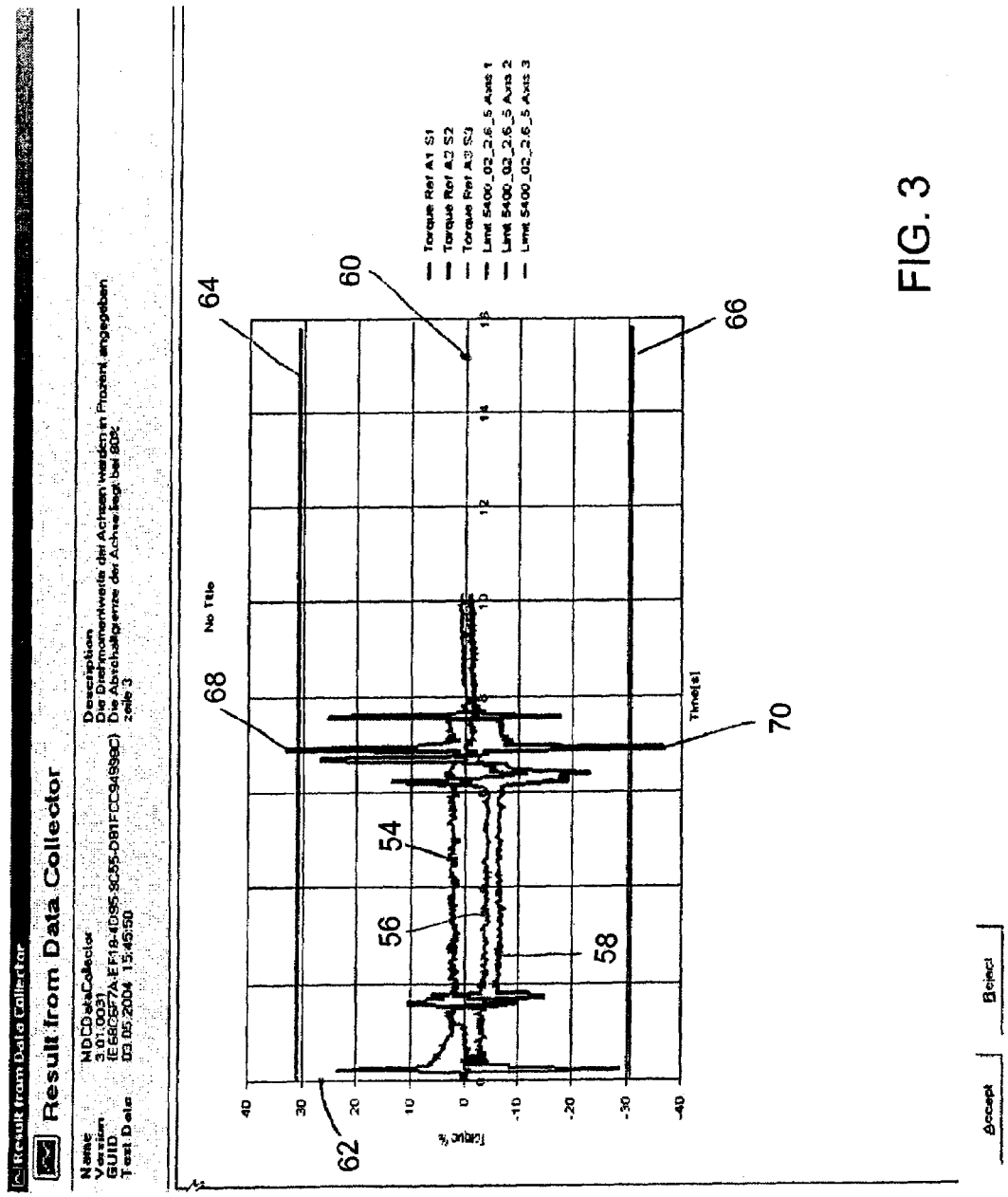
FIG. 3 is a block diagram showing a representation of torque profiles of various axles.

FIG. 3 shows the representation of torque profiles of three different robot axles. Here, a first torque profile 54, a second torque profile 56 and a third torque profile 58 are represented on a time axis 60, which indicates the variation over time of the torque signals in seconds. The y-axis of the graph is plotted as a torque axis 62, normalized to a maximum value that corresponds to a percentage loading of 100%, in such a way that the different axles of the robot 12 can also be comparatively represented in a graph. The different axles of the robot 12 are usually configured completely differently with respect to their type of construction, their drive, their performance, their transmission and so on, so that, although plotting in absolute values would be possible, it would be very confusing and in any event lead to an unfavorable representation. Also entered in the graphs is an upper limit value 64 and a lower limit value 66, the limit values 64, 66, each at approximately 30%, that is on the one hand plus 30% on the other hand minus 30%, describing a torque band, which is also referred to as a normal band. Therefore, no particular wear is to be expected at the robot axles if the torque profile remains within the band described.

For two 56, 58 of the three torque profiles 54, 56, 58, this is also always the case. The first torque profile 54, however, has a first point 68 and a second point 70 at which the band is left. These points are of particular interest for the wear appraisal of axles. The assessment of current axial wear can therefore be performed on the basis of various criteria.

One possibility is to count the number of those points, such as the points 68, 70, which exceed or leave the normal band. The occurring frequency of these events is in this case a measure of the wear of the axle concerned.

A further possibility is to use the maximum torque occurring in relation to a current torque with the inclusion of axle-specific parameters, that is empirical values, as a measure for assessment. To be regarded in particular as the current torque in this case is a mean value of torque values, which may be regarded as an arithmetic mean value over the entire measuring time period of the working cycle, or a selective mean value, which is obtained from the loading at rest, that is loading of the robot axle in the basic state of the robot without a work task.

A further possibility of assessment is to use the number of opposing maximum values when moving to a coordinate within a working cycle as a measure of assessment for wear appraisal. Yet another possibility is to consider a trend comparison of the values of the friction of a powered unit, that is in particular the motor, transmission and robot arm, within a movement from one coordinate within the working cycle of the robot to a second coordinate. However, still further values and data from the robot control, not described here in any more detail, also have to be included in the consideration for this. The individual values to be considered are, however, familiar to a person skilled in the art.

An axle 200 of the robot 12 is generally indicated using reference numeral 200 in FIG. 1.

This application claims the priority, under 35 U.S.C. § 119, of German patent application No. 10 2004 028 559.4, filed Jun. 15, 2004; the entire disclosure of the prior application is herewith incorporated by reference.

We claim:

1. A method for appraising axle wear of a robot arm of an industrial robot, which comprises the steps of:
    taking a bi-directional torque profile of at least one axle of the robot arm during at least one working cycle of the industrial robot and providing the torque profile to an evaluation device for an analysis;
    with the evaluation device, analyzing the torque profile for portions of the torque profile that exceed a previously fixed torque band;
    with the evaluation device, determining current axle wear by assessing a frequency and/or a curve profile of the portions of the torque profile;
    with the evaluation device, appraising axle wear of the robot arm based on the current axle wear for determining maintenance requirements; and
    storing the torque profile within the evaluation device for later use by a user.

2. The method according to claim 1, which further comprises performing one of:
    with the evaluation device, measuring the torque profile; and
    reading out the torque profile from a data memory of the evaluation device.

3. The method according to claim 1, which further comprises, with the evaluation device, analyzing a ratio of a maximum torque value in a specific portion of the torque profile to an averaged torque value in a previously defined time period within the working cycle considered for assessing the axle wear.

4. The method according to claim 1, which further comprises, with the evaluation device, analyzing at least one curve profile of a portion of the torque profile for assessing the axle wear.

5. The method according to claim 4, which further comprises, with the evaluation device, analyzing a slope of the curve profile at a time directly before and possibly after an extreme, taken from the latter up to at least a next-following point of inflection of the curve profile.

6. The method according to claim 1, wherein the evaluation device uses axle-specific parameters for assessing the axle wear.

7. The method according to claim 6, which further comprises determining the axle-specific parameters empirically or by a neural method.

8. The method according to claim 1, which further comprises representing at least one of the torque profiles and a torque band on a display device.

9. The method according to claim 1, which further comprises, with the evaluation device, appraising an absolute axle wear or axle state by taking into account the current axial wear together with a number of working cycles completed so far.

10. The method according to claim 1, which further comprises, with the evaluation device, estimating a time period until a wear limit for the axle is reached by taking into account the current axial wear and/or a number of working cycles completed so far.

11. A system for determining axle wear of a robot arm of an industrial robot, comprising:
    a data module containing data of a bi-directional torque profile of at least one axle during at least one working cycle of the industrial robot;
    an analysis module for analyzing portions of the torque profile that exceed a previously fixed torque band; and
    an assessment module for interpreting a frequency and/or a curve profile of the portions of the torque profile as axle wear of the robot arm, said assessment module, said data module, and said analysis module coupled to each other for exchanging the data with each other, said assessment module storing the axle wear of the robot arm and the torque profile for later use by a user.

12. The system according to claim 11, wherein at least one of said data module, said analysis module and said assessment module, is disposed in a robot controller.

13. The system according to claim 11, further comprising an evaluation device to be connected to a robot controller, at least one of said data module, said analysis module and said assessment module is disposed in said evaluation device.

14. The system according to claim 11, wherein the torque profile can be read out from a robot controller as direct or indirect values.

15. The system according to claim 11, wherein said data module, said analysis module and said assessment module are in each case computer program products each contained in a computer-readable medium.

* * * * *